United States Patent [19]

Frick

[11] Patent Number: 5,309,199
[45] Date of Patent: May 3, 1994

[54] PROCESS FOR THE PRODUCTION OF PHOTOGRAPHIC COPIES FROM PHOTOGRAPHIC COPY MASTERS ON A PHOTOGRAPHIC COPY APPARATUS

[75] Inventor: Beat Frick, Buchs, Switzerland

[73] Assignee: Gretag Imaging, AG, Regensdorf, Switzerland

[21] Appl. No.: 14,255

[22] Filed: Feb. 5, 1993

[30] Foreign Application Priority Data

Feb. 6, 1992 [DE] Fed. Rep. of Germany ..... 92810088

[51] Int. Cl.$^5$ ...................... G03B 27/32; G03B 27/52
[52] U.S. Cl. ........................................ 355/77; 355/38; 355/41
[58] Field of Search ............................. 355/41, 38, 77

[56] References Cited

U.S. PATENT DOCUMENTS

| | | | |
|---|---|---|---|
| 4,888,613 | 12/1989 | Zangenfeind et al. | 355/41 |
| 4,914,471 | 4/1990 | Saeki et al. | 355/40 |
| 4,918,484 | 4/1990 | Ujiie et al. | 355/41 |
| 4,931,832 | 6/1990 | Takenaka | 355/77 |
| 4,965,628 | 10/1990 | Olliver et al. | 355/41 |
| 5,017,014 | 5/1991 | Terashita | 356/404 |
| 5,122,645 | 6/1992 | Saeki et al. | 235/462 |
| 5,128,519 | 7/1992 | Tokuda | 235/375 |
| 5,148,213 | 9/1992 | Terashita | 355/38 |
| 5,157,437 | 10/1992 | Takenaka | 355/41 |
| 5,159,386 | 10/1992 | Taniguchi et al. | 355/38 |

FOREIGN PATENT DOCUMENTS

| | | |
|---|---|---|
| 0293887 | 12/1988 | European Pat. Off. |
| 0339643 | 11/1989 | European Pat. Off. |
| WO91/00547 | 1/1991 | PCT Int'l Appl. |
| WO91/13383 | 9/1991 | PCT Int'l Appl. |

OTHER PUBLICATIONS

European Search Report EP 92 81 0088, Oct. 9, 1992.

Primary Examiner—Richard A. Wintercorn
Attorney, Agent, or Firm—Burns, Doane, Swecker & Mathis

[57] ABSTRACT

Process for the production of photographic copies from photographic copy masters in a photographic copy apparatus, wherein initially in a measuring station of the photographic copy master an exposed photographic master material, on which photographic copy masters are exposed, is analyzed master by master. In the process, the measuring data necessary for the exposure of each master is determined, together with the size and the position of the center of each copy master on the film. A number is assigned unambiguously to each master, the number being determined by scanning an expanded DX code provided in periodic intervals in a border area of the master material by a single bar code detector used in the measuring station to read the expanded DX code. The number is determined by reading the expanded DX code. The numbers assigned to the copy masters, together with the associated measured data, are passed on to a computer and control unit. In an exposure station, located downstream from the measuring station in the direction of transport of the master material, the copy masters are exposed according to the measured data belonging to the prevailing copy master number present in the computer and control station onto photographic copy material to produce photographic copies. The number assigned to each copy master is applied to the photographic copy, preferably to the reverse side.

12 Claims, 5 Drawing Sheets

PROCESS FOR THE PRODUCTION OF PHOTOGRAPHIC COPIES FROM PHOTOGRAPHIC COPY MASTERS ON A PHOTOGRAPHIC COPY APPARATUS

BACKGROUND OF THE INVENTION

The invention concerns a process for the production of photographic copies from photographic copy masters in a photographic copy apparatus, having a measuring station wherein an exposed photographic master material, on which photographic copy masters are exposed, is analyzed master by master.

Photographic copy masters, such as exposed negative film material, are exposed in a photographic copy apparatus onto photographic copy material, usually photographic positive paper, and are delivered together with the exposed photographic copy material to the customer. Reorders in most cases are from existing positive images. It is usually necessary for the customer to find the corresponding negative and to communicate it to the laboratory. The negative films at this point in time are typically present in strips of four to six negative masters. In order to facilitate the correlation of the positive images with the negative masters, the negative film manufacturers provide continuous numbering at regular intervals on the negative film strips, which become visible during development and may be coordinated with a given negative master. However, as during the exposure of the negative film it is being transported at different uniform rates in each photographic camera, generally the relative position of the negative masters relative to the numbers applied during manufacture is not correlated. For this reason, it is frequently very difficult for the customer to coordinate the negative desired in a given case with the correct number. If the customer in such a case has decided on a negative with respect to a certain number, as may occur in particular during the automatic processing of the order, individual copies of negatives other than the one ordered (for example the preceding or following one) will be used in processing the order. To avoid such an error, it has often been necessary heretofore for the operating personnel of the laboratory, either together with the customer or alone, to decide which negative is actually the correct one. This condition is unsatisfactory for both parties and is also highly laborious and personnel intensive.

In numerous cases the relative position of the negative masters to the numbers on the negative film strips is such that even experienced operators in the laboratories encounter severe problems in arriving at an unambiguous correlation. For this reason, in EP 0 293 887 a process and an apparatus are proposed to eliminate this condition. In the process described therein, films are used on which the numbers additionally are represented by bar codes, applied between the perforation holes and the outer edge of the negative film. This bar code is provided in addition to the so-called DX code, which also is a bar code and contains information concerning the manufacturer, the type of film and the production lot number. In the measuring station of a photographic laboratory, the numbers coded in the bar code are read by means of a detector which is provided in addition to the detector for the DX code and together with further information relative to the negative concerned, and punched for example into a perforated strip. In the exposure station another detector is present for the bar code to again read the numbers. Synchronously, the information contained on the perforated strip is also read and processed. By comparing the negative number detected in the exposure station with the information contained on the perforated strip, the correct exposure data are assigned to the particular negative. With the aid of these data, the negative master is copied onto positive photographic paper to produce a positive image. Additionally, the number assigned to the negative in the measuring station is printed onto the reverse side of the paper image. This process should be suitable both for full size and for half size images. It is stated in the reference that in the case of half size images it may be necessary to print two adjacent numbers onto the paper image to assure unambiguous correlation.

The process described and the corresponding apparatus are optimized for the aforementioned specific negative film materials, where the numbers are represented as additional strip codes, located on the edge of the film opposite the DX code.

On the other hand there is a demand for negative film materials on which one edge of the film is free of coded information. It may be desirable to provide thereon information relative to the negative film material that may be read without additional devices by the operating personnel, so that the negative film may be processed correctly even in photographic copy apparatuses without DX code detectors. It has therefore been proposed to apply to the negative film material a so-called expanded DX code. This expanded DX code contains in addition to the coded information of the existing DX code, another coded number and is located as before on the lower edge of the film. In this manner the additional bar code may be eliminated and the upper film edge remains free for other uses.

There is therefore the problem of creating a process for the production of photographic copies from photographic copy masters in a photographic copy apparatus, making it possible to work with the modified negative film material and the expanded DX code. Furthermore, the unambiguous correlation of the master and the copy both for full size and half size images should be possible by citing a single number. The process should be simple and capable of automation. Any multiple detection of coded information in the individual processing stations should be avoided. The corresponding apparatus should be simple in its configuration and no additional detectors should be required. A process is to be created making it easier for the customer to determine the correct copy master belonging to the reorder desired. The process should also permit the reliable processing of customer reorders.

SUMMARY OF INVENTION

All of the disadvantages of the state art described above are eliminated and these objects and others are attained by a process according to the invention. In an exemplary embodiment, the invention relates to analyzing a photographic master material on which photographic copy masters are exposed in a measuring station; determining measuring data necessary for exposure of each master; assigning a number unambiguously to each master, said number being determined by detecting a bar code provided in periodic intervals in a border area of the master material; passing the numbers assigned to the copy masters together with the associated measured data to a computer and control unit;

exposing each copy master, using the measured data associated with the prevailing copy master number present in the computer and control station, onto photographic copy material to produce photographic copies in an exposure station located after the measuring station in the direction of transport of the master material; applying the number assigned to each copy master to the photographic copy, said master material having an expanded DX code; and detecting the coded numbers using a bar code detector provided in the measuring station reading the expanded DX code.

BRIEF DESCRIPTION OF THE DRAWINGS

Other objects and advantages of the present invention will become apparent from the following description relative to the exemplary embodiments shown in the figures, wherein the following are shown in schematic views.

DETAILED DESCRIPTION OF THE PREFERRED EMBODIMENTS

Figure 1:
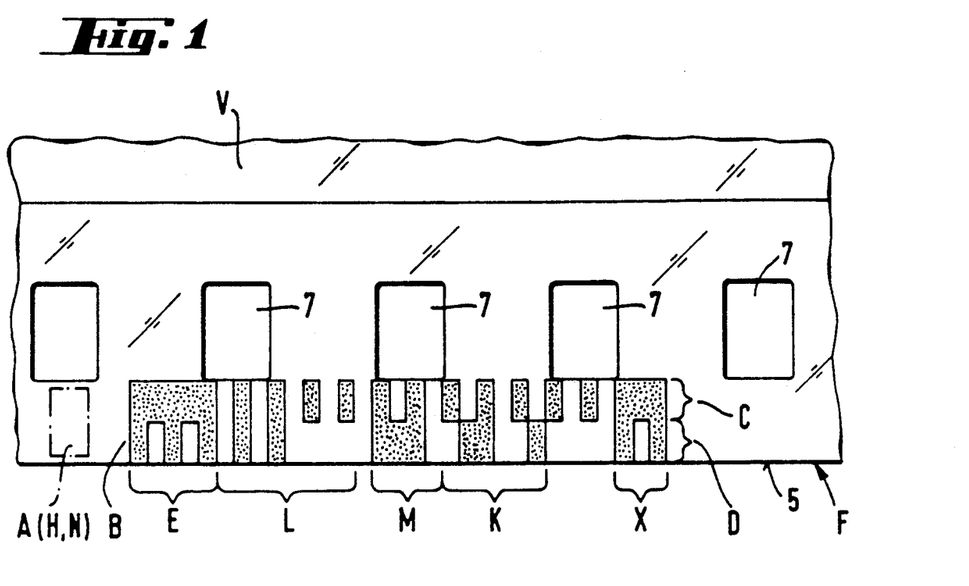
FIG. 1 shows an example of a so-called expanded DX code.

FIG. 1 is an example of a so-called expanded DX code. The expanded DX code is located usually, as shown, between the perforation holes 7 and the lower longitudinal edge 5 of the master material F. The master material usually consists of a confectioned negative film, for example a color film of a 135 mm format, but it may also be a transparency of the same format. However, other film formats may also be provided with such an expanded DX Code B. The area between the perforation holes 7 and the upper longitudinal edge 6 (FIG. 3) of the film F is usually left free or carries analogous information in the form of alphanumerical symbols for operators in the laboratories. The expanded DX Code B of FIG. 1 is a bar code comprising two parts placed above each other in the longitudinal direction of the film F. The part immediately adjacent to the lower longitudinal edge is the data part D while the part C adjacent to the perforation holes 7 carries a bit pattern to synchronize a bar code reader.

The data part D of the expanded DX Code B corresponds in its fundamental configuration extensively to the known DX Code. In particular, the code is limited by an entry sequence E and an exit sequence X. Between the entry sequence E and the exit sequence X the expanded information proper is contained. This comprises, in the order of its inclusion after the entry sequence E, a section L wherein information concerning the type of film and its sensitivity are coded, a section M in which the manufacturer and optionally the production lot number in which the film originated are specified, and a sequence in which a number K is coded. This number K corresponds to the analog number A provided by the manufacturer in standardized intervals as viewed in the direction of transport T of the film before the expanded DX Code B on the lower edge 5 of the film. These analog numbers are present in the case of a film of the 135 format as the principal and secondary numbers H and N; they are placed beginning with the principal number H alternatingly in intervals of 19.5 mm on the film F. Principal numbers are the continuous digits 0, 1, 2 etc., while the secondary numbers N are for example the corresponding digits 0A, 1A, 2A, etc.

Figure 2:
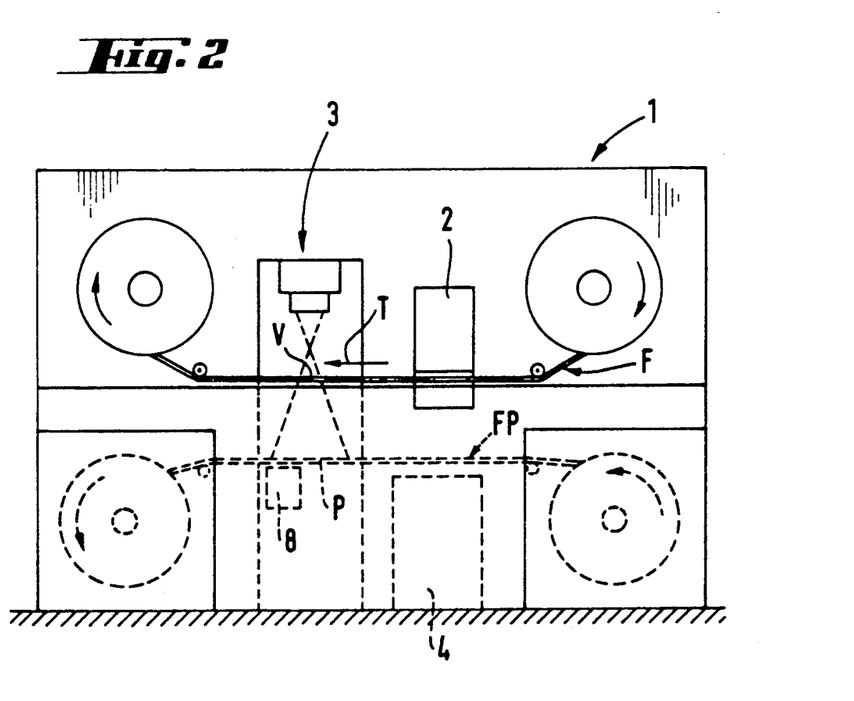
FIG. 2 shows a photographic copy apparatus.
Figure 3:
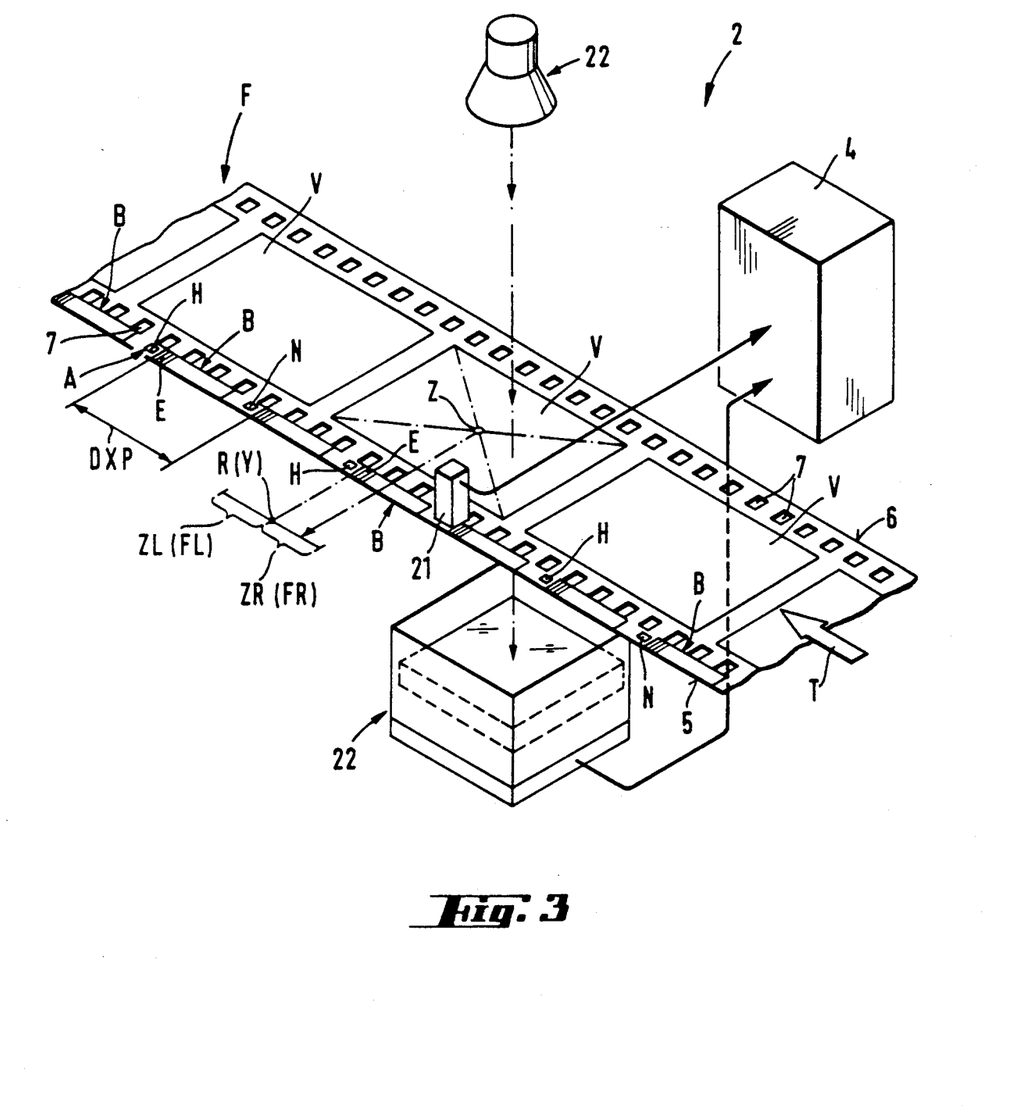
FIG. 3 shows master material with full size copy masters in the measuring station of a photographic copy apparatus.

FIG. 2 shows a photographic copy apparatus 1 for the processing according to the invention of master materials F with an expanded DX Code B. The photographic copy apparatus, preferably a photographic color copy apparatus, essentially comprises a measuring station 2 and an exposure station 3, through which in the direction of transport T, in succession, exposed and developed master material F, for example a 135 color film, is passed. In the measuring station 2 the copy masters V located on the film F, usually as the negative images, are analyzed relative to, among other characteristics, their color and density composition, and the measured data is conducted to a computer and control unit 4 connected with the measuring station 2. In the exposure station 3, which is also connected with the computer and control unit, the copy masters V are then exposed in keeping with the values measured, onto a photosensitive copy material, for example photographic paper, in order to produce photographic copies P. A printing unit 8, also located in the exposure station 3, makes it possible to print or otherwise apply additional information, for example, onto the reverse side of the photographic paper M. Such a device is described for example in EP 0 293 887, the disclosure of which is hereby incorporated by reference in its entirety. The differences of the apparatus to carry out the process according to the invention are to be found in the configuration of the measuring station 2 and are explained in more detail in connection with the description of the process according to the invention. Exposed and developed photographic master material F, in particular that of the 135 format, may contain (depending on the photographic taking process) full or half size copy masters V, usually negative color images. FIG. 3 shows schematically a section of an exposed and developed negative film F containing full size copy masters V, in the measuring station 2. The figure is restricted for reasons of clarity to what is absolutely necessary for the comprehension of the process according to the invention. The negative film strip is designated in its entirety by F. The full size negative images carry the symbol V. Over the negative film strip F a measuring layout 22 is indicated; it is connected with the computer and control unit 4. By means of this measuring layout 22 the negative images V are analyzed relative to their color and density impression and the measured data passed on to the computer and control unit. There, for each negative image from the measured data the necessary copying light quantities are determined for the three basic colors of red, green and blue. The measuring layout also determines the local position of the center Z of a negative image on the film. This is accomplished by any conventional path detection algorithm, such as those usually found in the presently available photographic copy apparatuses.

In the area of the lower longitudinal edge 5 of the film F, preferably above the transport path T of the film F, a bar code detector 21 is arranged; it is connected with the computer and control unit 4. The bar code detector 21 is placed above the film in a manner such that it is able to read the expanded DX Codes B passed through the measuring station 2 during the transport of the film F. In particular, the bar code detector 21 also detects the entry sequence E of the expanded DX code and passes on its position on the film F as the reference point R to the computer and control unit. By means of the computer and control unit 4, two coordination ranges of defined lengths are determined beginning at the location of the appearance of the entry sequence E as the reference point R on the film F, in and against the transport direction of said film F.

Figure 5:
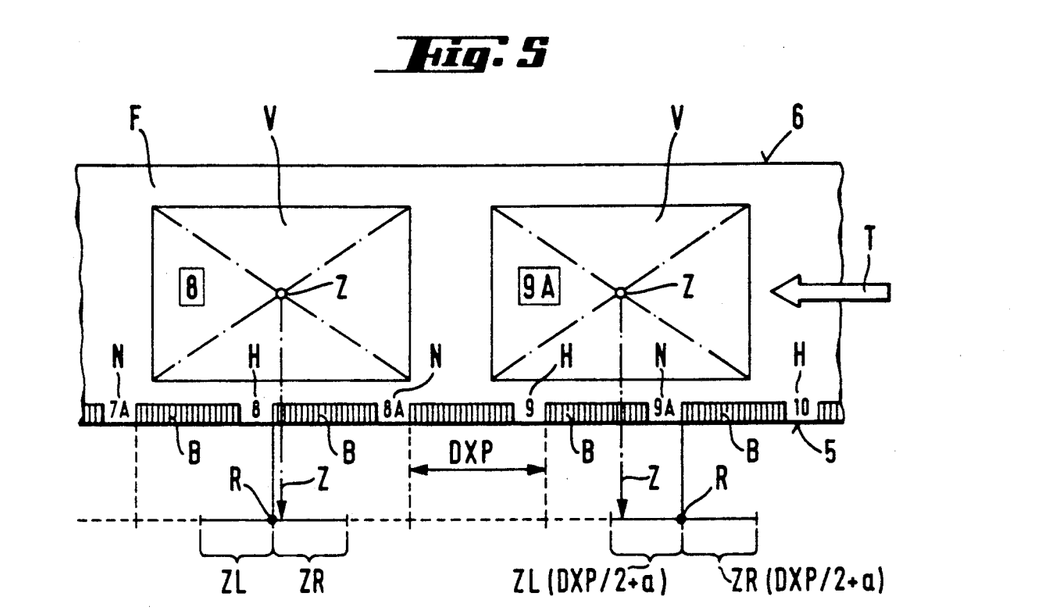
FIG. 5 shows a diagram to explain the process during the initial passage of full size copy masters.

The diagram in FIG. 5 explains this process for the initial passage of full size negative images in more detail. During the transport of the film F from right to left, as shown as an example, a left coordination range ZL extends from the reference point R in the direction of transport T to the left, while a right coordination range ZR extends against the direction of transport to the right. It is then examined whether the local position of the center Z of the instantaneous negative image N is located in one of these two coordination ranges ZL and ZR. If this is so, the number K contained in the expanded DX Code B, the entry sequence E whereof provided the reference point R, is assigned to the prevailing negative image V. If the center Z is not in one of the two coordination ranges ZL or ZR defined, the process is repeated with next expanded DX Code B and it is determined whether the center of the prevailing negative image is located in one of the coordination ranges defined for this expanded DX Zone B. The number K assigned may be a principal number H or a secondary number N. According to the view of FIG. 5 the number 9A is assigned to the right hand negative image V, said number being a secondary number N. The center Z of the image to the left of it is located in neither of the coordination ranges of the expanded DX Code B containing the number 9 or those of the expanded DX Code B with the number 8A. However, the center of the negative image V is located in the right hand coordination range ZR of the expanded DX Code B with the number 8. Consequently, the negative image is assigned the principal number 8.

Preferably, the two coordination ranges ZL and ZR are of equal length. It is especially convenient to chose the length of the coordination ranges ZL and ZR as DXP/2+a. DXP here signifies the distance of adjacent expanded DX Codes B and amounts to about 0.1 mm to about 2 mm, preferably about 0.5 mm. The variable a takes into account possible inaccuracies in the position detection of the entry sequence E of the expanded DX Code B and the determination of the local position of the center of the negative image V during the initial passage of the film F.

Figure 4:
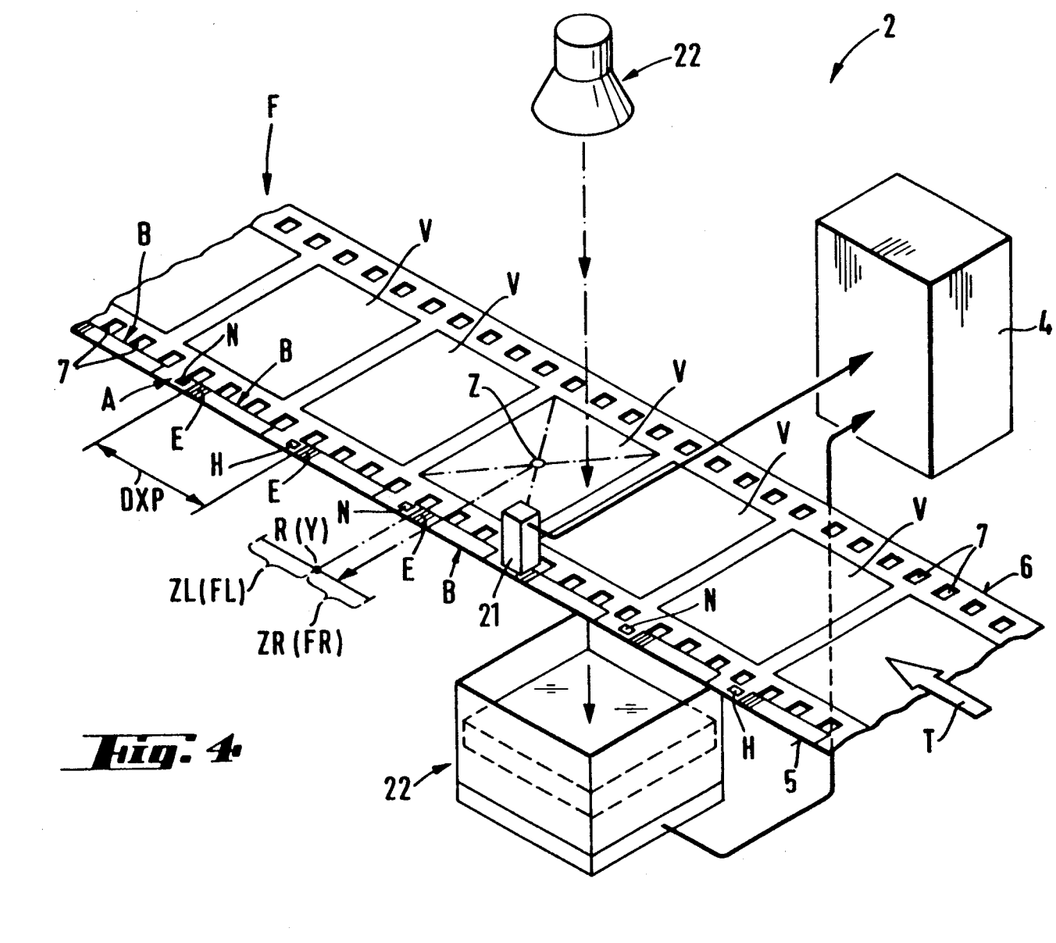
FIG. 4 shows master material with half size copy masters in the measuring station of a photographic copy apparatus.

In FIG. 4 a negative film F with half size negative images V is shown in the measuring station 2. The coordination of the coded numbers K contained in the expanded DX Code B is similar in principle to the coordination described above with full size negative masters V. Additionally, however, it is also examined whether the center Z of the half size negative image V is located in the left or right coordination range ZL or ZR and this information is recorded. In order to distinguish between two half size negative images in which, relative to the same reference point, the center of one negative image is located in the left coordination range ZL and the center of the second half size negative is located in the right coordination range ZR, a special symbol, (e.g., a small asterisk or the like), is added to the detected number.

Figure 6:
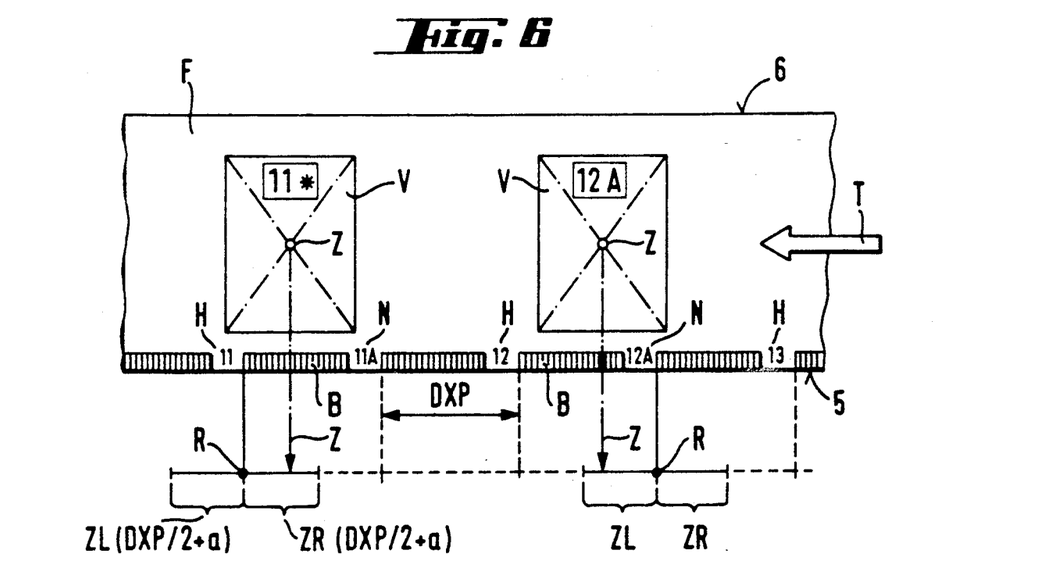
FIG. 6 shows a diagram to explain the process during the initial passage of half size copy masters.

In FIG. 6 the process for the initial passage of half size copy masters is explained in more detail with reference to the diagram. For reasons of clarity, as in FIG. 5, the perforation holes 7 in the film F are not shown. The center of the right hand half size negative image is found in the left coordination range ZL of the expanded DX Code B with the number 12A and is therefore assigned this number. The center of the left hand half size negative image is in the right hand coordination range of the expanded DX Code B with the number 11. According to stipulation, this negative image is additionally assigned a special symbol, in this case a small asterisk.

In contrast to the process described in EP 0 293 887, the process according to the invention only requires one bar code detector 21 in the measuring station 2, which is capable of detecting both the information E, L, M and X contained in the conventional DX code and the coded negative number K.

By means of the coordination process described above, all of the negative images V present on the film F may be differently identified and their position on the film unambiguously determined, independently of whether they are full or half size images. This information is recorded in the computer and control unit for the further processing of the negative film. Subsequently, in the exposure station 3 each full or half size image present on the film is repositioned and exposed, in keeping with the exposure data determined, onto photosensitive paper M in order to initially produce positive images of the negative images V. The number stored in the computer and control unit 4 for each negative image V is passed on to the printing unit located preferably under the transport path of the photosensitive paper M and printed preferably on the reverse side of the images. It is understood that in place of a printing unit, another device may be provided, which makes it possible for example to expose the corresponding negative number on the edge of the image on the front side.

Figure 7:
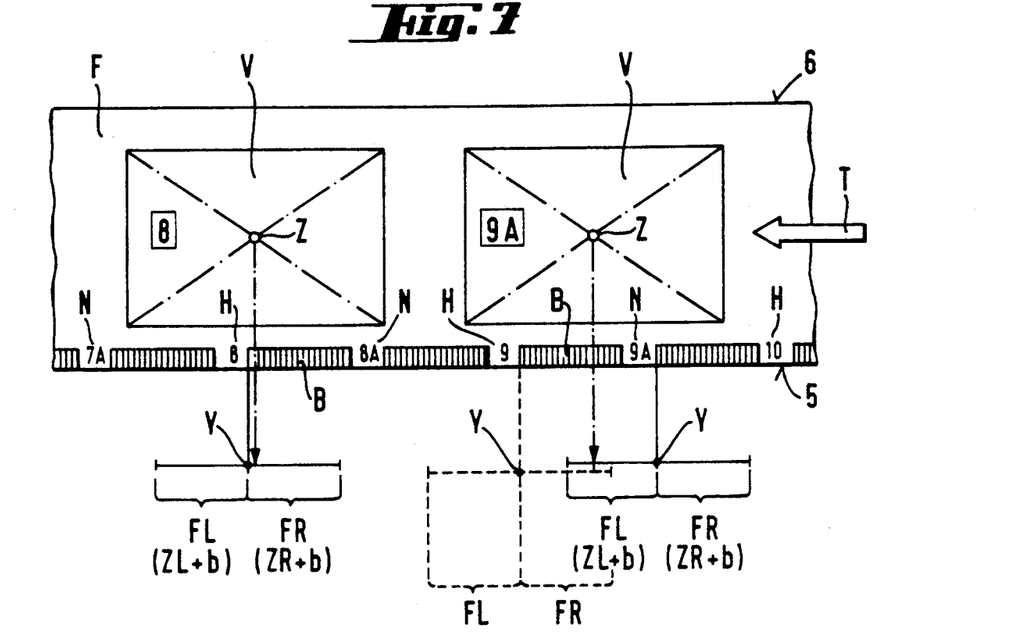
FIG. 7 shows a diagram to explain the process in the case of reorders of full size copy masters; and, FIG. 8 shows a diagram to explain the process in the case of reorders of half size copy masters.
Figure 8:
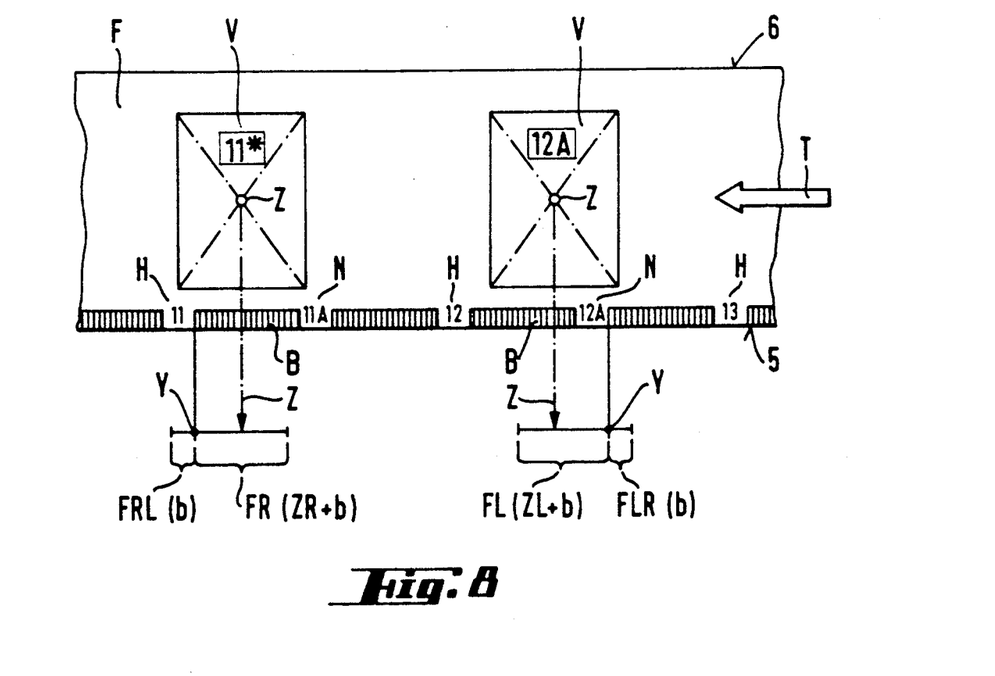

FIGS. 7 and 8 show the process for reorders of full size (FIG. 7) or half size (FIG. 8) images schematically. If a customer desires to reorder certain images, all he has to do is read the numbers of existing images of which additional copies are desired, and to communicate this number to the laboratory when presenting the negative film strips. In the laboratory the numbers provided by the customer are entered in the computer and control unit 4 of the photographic copy apparatus for example by means of a keyboard. Upon the passage of the film strips, which usually are bonded, spliced or otherwise combined with each other, the path detection algorithm recognizes whether the reorder involves full or half size negative images V. It is not absolutely necessary to combine only full size or half size images with each other, the two sizes may also intermixed are readily detected.

The process for full size negative images V is shown in FIG. 7. In the measuring station each negative image is analyzed relative to its color and density characteristics and the measured data passed on to the computer and control unit 4, wherein the quantities of copy light are determined. By means of the aforementioned detection algorithm, the position of the center Z of each negative image V on the film is determined in a known manner. With the aid of the bar code detector 21, the expanded DX Code B is read and in particular the occurrence of the entry sequence E of each expanded DX Code detected. The location of the appearance of the entry sequence E on the film F is defined as the reference point Y. Then, in a manner analogous to the process during the initial passage of the film, beginning at the reference point Y a capture range of a defined length is determined on the film, in and against the direction of transport T. If the film is transported from right to left, the capture range extending from the reference point Y in the direction of transport T is designated as the left capture range FL and correspondingly the capture range extending from the reference point against the direction of transport T is designated as the right capture range FR. It is then determined whether the location of the center Z of the negative image V is found in the left or right capture range FL or FR. In the positive case, the negative image V is considered to belong to the prevailing number K read in the expanded DX Code B; otherwise the examination is repeated with the next DX Code B during the transport of the film in the transport direction T.

In the case of full size negative images V, the right and the left capture ranges FR and FL are preferably of equal length, as shown. It is especially appropriate in this case to chose the length of the capture ranges in a manner such that it corresponds to the length of the coordination ranges increased by a tolerance length b. The tolerance length b may amount to about 0.4 mm to about 4.00 mm, preferably about 3.0 mm. The tolerance length b takes into account possible inaccuracies in the detection of the appearance of the entry sequence E of the expanded DX code and possible inaccuracies in the detection of the center Z of the negative image. The tolerance length is chosen larger relative to the initial passage of the film F, because in the processing of the reorders, both the possible error sources of the initial passage of the film and the aforementioned possible detection errors in the processing of the reorder must be taken into account. Because of the tolerance lengths chosen, the right and the left capture range of adjacent expanded DX codes may overlap, so that an image may even satisfy both the condition of coordination of one and the other number. In this case both possibilities are recorded in the computer and control unit. In later exposures, the possibility which coincides with the number given by the customer is selected.

In the case of half size negative images V, the process differs slightly from that of full size images, because as in this case, negative images V may appear with the same number distinguished only by a special symbol. This process variant is shown in FIG. 8 and differs from the process variant for full size negative images V in particular in that it now must be decided whether the center Z of a negative image V in the initial passage had been found in the left or the right coordination range ZL or ZR. The distinguishing characteristic is the special symbol that has been assigned to the negative image in one or the other case additionally to the corresponding number. This information is entered simply by citing the corresponding number together with the special symbol concerning the number of the copy desired, for example by means of a keyboard into the computer and control unit 4. In the case of a negative image V, the center Z of which is found in the measuring station 2 in the left hand coordination range and which according to stipulation has not been assigned a special symbol, the length of the left capture range FL will be the length of the left coordination range ZL increased by the tolerance length b, which may amount to about 0.4 mm to 4.0 mm, preferably about 3.00 mm and which takes into account possible inaccuracies in the detection of the appearance of the entry sequence E of the expanded DX code and possible inaccuracies in the detection of the center Z of the negative image V in the initial passage of the film and in the processing of the reorder. The length of the associated capture range FLR to the right of the reference point Y is chosen in keeping with the tolerance length b. Half size negative images V, the center whereof has been found in the measuring station in the right hand coordination range ZR, are marked by stipulation by a special symbol, for example a small asterisk, to distinguish them from the negative image, the center of which was in the left coordination range. For these negative images V, the right capture range FR is chosen as the length of the right coordination range ZR increased by the tolerance length b. The corresponding left capture range FRL to the left of the reference point Y is chosen in keeping with the tolerance length b.

Finally, the negative images ordered by the customer and the numbers whereof had been entered in the computer and control unit 4, are selected and the corresponding full or half size negative images V exposed onto photosensitive paper M in keeping with the exposure data belonging to the prevailing negative number. In this manner, the number of the copies ordered are produced from the negative desired. The negative number belonging to a given negative image V is printed by the printing unit 8, which preferably is located under the photopaper M, preferably onto the reverse side of the photo image P or applied to it in a similar manner.

The process according to the invention makes possible the unambiguous coordination of the numbers already provided on the negative film with the negative images produced on it. Although this coordination may not always be clear to the viewer and it often may be very difficult to decide which number belongs to which negative image, the process according to the invention makes it possible to accomplish this simply and rapidly for both full and half size negative images. Even in the case of faulty negative images, which may overlap due to a failure of the transport mechanism of the camera, unambiguous coordination is assured. The only boundary condition for full size negative images is that the distance of the centers of two successive negative images must not be less than 34 mm. For half size negative images the corresponding distance is 17 mm. If these distances are not attained, the negative images are ignored and the process continued with the next image. To detect the prevailing negative number only one bar code detector is required in the measuring station. Expensive perforating punches or the like may be eliminated.

The reordering of images by customers is clearly simplified. It is no longer necessary to guess the correct negative number on the negative film strip, as the number may be read simply, for example, from the reverse side of the images to be reordered. But even in the case of numbers read by the customer from the negative film strip, safe processing of the order is generally possible. In addition, there is no longer the risk that the data may be misinterpreted in the laboratory. The coordination of the negative numbers with the images produced always takes place by the same process, so that it is always assured that the customer receives images according to his order.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. Process for the production of photographic copies from photographic copy masters in a photographic copy apparatus, comprising the steps of:
   analyzing a photographic master material on which photographic copy masters are exposed in a measuring station;
   determining measuring data necessary for exposure of each master;
   assigning a number unambiguously to each master, said number being determined by detecting a bar code provided in periodic intervals in a border area of the master material;
   passing the numbers assigned to the copy masters together with the associated measured data to a computer and control unit;
   exposing each copy master, using the measured data associated with the prevailing copy master number present in the computer and control station, onto photographic copy material to produce photographic copies in an exposure station located after the measuring station in the direction of transport of the master material;
   applying the number assigned to each copy master to the photographic copy, said master material having an expanded DX code; and
   detecting the coded numbers using a bar code detector provided in the measuring station reading the expanded DX code.

2. Process according to claim 1, further comprising the steps of:
   recording an appearance of a standardized entry sequence of the expanded DX code for coordinating a number detected in an expanded DX code with a certain master in the measuring station by means of the bar code detector;
   recording a location of the appearance of the entry sequence on the master material;
   selecting said location of the entry sequence on the master material as the reference point;
   determining a coordination range of defined length with respect to said reference point in and against a direction of transport of the master material, wherein for transport of the master material from right to left, a left and a right coordination range are determined;
   determining a position of a center of a copy master on the master material;
   determining whether the location of said center of the copy master is within the left or the right coordination range established to the left or the right of the reference point and if so, assigning the number contained in the DX code to said copy master, and if not, the coordination process is repeated with the expanded DX code next in the direction of transport of the copy material.

3. Process according to claim 2, wherein the coordination ranges in and against the transport direction of the master material are of equal length.

4. Process according to claim 3, wherein a length of the coordination ranges is chosen as $DXP/2+a$, wherein DXP is a distance of adjacent expanded DX codes and wherein a amounts to approximately 0.1 mm to about 2 mm, preferably about 0.5 mm.

5. Process according claim 4, further comprising the steps of:
   determining, for half size copy masters, whether a copy master center has been found in the coordination range to the left or the right of the reference point and when the center has been found in the right coordination range, assigning an additional special symbol to the number detected.

6. Process according to claim 5, further comprising the steps of:
   entering, for reorders of photographic copies, the numbers provided by a customer from a reverse side of already existing copies, and entering a number of copies desired, in the computer and control unit;
   comparing the entered numbers provided by the customer with numbers assigned in the measuring station to the negative masters; and producing in the exposure station, the desired number of copies, the number of which agrees with those provided.

7. Process according to claim 6, further comprising the steps of:
   detecting a size of a copy master in the measuring station; and
   defining, for full size copy masters, a length of right and left capture ranges as a length of the coordination ranges increased by a tolerance length b amounting from about 0.4 mm to about 4.0 mm, preferably about 3.0 mm.

8. Process according to claim 6, further comprising the steps of:
   detecting a size of a copy master in the measuring station; and
   defining, for half size copy masters whose center has been found in their initial passage within the left coordination range, a length of the left capture range as the length of the left coordination range increased by a tolerance length b amounting from about 0.4 mm to about 4.0 mm, preferably about 3.0 mm, and defining a length of an associated capture range to the right of the reference point with the tolerance length b; and
   defining, for half size copy masters whose center has been found in the measuring station within the right coordination range and which therefore had been assigned a special symbol in addition to the number detected, a length of a right capture range as the length of the right coordination range increased by a tolerance length b, amounting from about 0.4 mm to about 4.0 mm, preferably about 3.0 mm, and defining a length of the associated capture range to the left of the reference point with the tolerance length b.

9. Process according to claim 8, further comprising the steps of:
   printing numbers assigned to the copy masters on the reverse side of the corresponding photographic copies.

10. Process according claim 1, further comprising the steps of:

determining, for half size copy masters, whether a copy master center has been found in a coordination range to the left or the right of the reference point and when the center has been found in the right coordination range, assigning an additional special symbol to the number detected.

11. Process according to claim 1, further comprising the steps of:

entering, for reorders of photographic copies, the numbers provided by a customer from a reverse side of already existing copies, and a number of copies desired, in the computer and control unit;

comparing the numbers provided by the customer with numbers assigned in the measuring station to the negative masters; and producing in the exposure station, the desired number of copies, the number of which agrees with those provided.

12. Process according to claim 1, further comprising the steps of:

printing numbers assigned to the copy masters on the reverse side of the corresponding photographic copies.

* * * * *